United States Patent
Okamoto

(10) Patent No.: US 6,784,932 B1
(45) Date of Patent: Aug. 31, 2004

(54) HIERARCHICAL PIXEL READOUT MULTIPLEXER WITH SWITCHED CAPACITORS FOR CANCELLING BUFFER OFFSETS

(75) Inventor: Fuyuki Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,891

(22) Filed: Apr. 20, 2000

(30) Foreign Application Priority Data

Apr. 26, 1999 (JP) ............................................. 11-117429

(51) Int. Cl.⁷ .......................... H04N 3/14; H04N 5/335
(52) U.S. Cl. .................................. 348/302; 250/208.1
(58) Field of Search ................................ 348/245, 294, 348/298, 301, 302, 311, 322, 323, 324, 308; 257/239; 250/208.1, 208.6

(56) References Cited

U.S. PATENT DOCUMENTS

| | | | | |
|---|---|---|---|---|
| 5,144,133 A | * | 9/1992 | Dudley et al. ........... | 250/208.1 |
| 5,296,696 A | * | 3/1994 | Uno ........................ | 250/208.1 |
| 5,485,206 A | * | 1/1996 | Nakagawa et al. ......... | 348/301 |
| 6,476,864 B1 | * | 11/2002 | Borg et al. ................. | 348/245 |
| 2001/0012070 A1 | * | 8/2001 | Enod et al. ................. | 348/302 |

FOREIGN PATENT DOCUMENTS

| | | |
|---|---|---|
| JP | 2000-077642 | 3/2000 |
| JP | 2000-115642 | 4/2000 |

OTHER PUBLICATIONS

"A 200 mW 3.3V CMOS Color Camera IC Producing 352x288 24b Video at 30 Frames/s"; M. Loinaz et al.; pp. 168–169.

* cited by examiner

*Primary Examiner*—Vu Le
*Assistant Examiner*—Kelly L. Jerabek
(74) *Attorney, Agent, or Firm*—Katten Muchin Zavis Rosenman

(57) ABSTRACT

A hierarchical readout circuit includes a plurality of first capacitors for respectively interposed in a plurality of lines at which individual voltages are developed. Before the individual voltages appear at the lines, the inputs of the first capacitors are simultaneously biased at least once, and the outputs of the first capacitors are simultaneously biased. The output of each of the first capacitors is selectively biased again in the presence of the individual voltages at the lines. A plurality of buffers are connected in stages in a hierarchical configuration to the outputs of the first capacitors. Scanning circuitry selectively couples the output of a lower-stage buffer to a higher-stage buffer via a second capacitor. The output of the second capacitor is first biased before the individual voltages appear at the lines and then at periodic intervals before each first capacitor is selectively biased again.

4 Claims, 4 Drawing Sheets

US 6,784,932 B1

HIERARCHICAL PIXEL READOUT MULTIPLEXER WITH SWITCHED CAPACITORS FOR CANCELLING BUFFER OFFSETS

BACKGROUND OF THE INVENTION

1. Field of the Invention

The present invention relates generally to solid-state imaging devices, and more particularly to a hierarchical pixel readout multiplexer for serially reading charges column by column from each row of a matrix array of sensors, or pixels.

2. Description of the Related Art

In a solid-state imaging device, photodiode sensors (pixels) are arranged in a matrix array of rows and columns (FIG. 1). A large number of row select transistors are connected to each column select line to respond to row select signals from a row scanner 11 for simultaneously developing charges from the photodiodes of each row. The developed charges are then serially read out from the column select lines into an external circuit. Since many row select transistors are connected to each column select line, the latter is over-loaded by parasitic capacitances and hence it is not sufficient for a single buffer to drive the external circuit at high speed. To solve this problem, the capacitive load of each column select line is distributed among a number of buffers, as disclosed in "A 200 mW 3.3V CMOS Color Camera IC chip Producing 352×288 24b Video at 30 Frames/s", M. Loniaz et al., (The 1998 IEEE International Sold Solid-State Circuits Conference Digest of Technical Papers, pp. 168–169). One example of such pixel readout multiplexer 12 is shown in FIG. 1 as comprising a plurality of buffers (unity-gain amplifiers) 14, 15 and 16 connected in stages of hierarchical configuration, with the first-stage buffers 14 being connected respectively to the column select lines of the matrix array 10 and divided into groups corresponding to the second-stage buffers 15. The output of each first-stage buffer 14 is connected by a switch 17 to the associated second-stage buffer 15, whose output is connected by a switch 18 to the input of the third-stage buffer 16. Switches 17 and 18 are controlled by a column scanner 13 so that each column select line is successively connected through the associated first- and second-stage buffers 14 and 15 to the third-stage buffer 16.

However, since different buffers are used to read signals from the column select lines, variability of their operating characteristics, such as voltage offsets, results in an output signal which deviates from what would otherwise be produced by an ideal single buffer. For example, if two first-stage buffers have uniquely different offset voltages, the output of each buffer would deviate from the input voltage by an amount corresponding to its own offset voltage. If the input signals of such buffers are of equal magnitude, the difference between their offset voltages results in the generation of noise in the output signal.

SUMMARY OF THE INVENTION

It is therefore an object of the present invention to provide a hierarchical readout circuit that can compensate for buffer offsets.

According to a first aspect of the present invention, there is provided a hierarchical readout circuit comprising a plurality of first capacitors respectively interposed in a plurality of lines at which individual voltages are developed, a plurality of first buffers respectively connected to the outputs of the first capacitors, scanning circuitry for selectively coupling one of the outputs of the first buffers to a circuit node, a second buffer for producing an output signal, and a second capacitor connected between the circuit node and the second buffer. Bias control circuitry is provided for controlling potentials at the inputs and the outputs of the first capacitors and a potential at the output of the second capacitor so that the output signal of the second buffer contains a differential voltage between a bias voltage and each of the individual voltages.

In a preferred embodiment, the control circuitry is configured to simultaneously bias the inputs and outputs of the first capacitors before the individual voltages appear at the lines, selectively bias the output of each of the first capacitors again in the presence of the individual voltages at the lines, and periodically bias the output of the second capacitor before each of the first capacitors is selectively biased again.

According to a second aspect, the present invention provides a hierarchical readout circuit comprising a plurality of first capacitors for respectively interposed in a plurality of lines at which individual voltages are developed, first voltage biasing circuitry for simultaneously biasing the inputs of the first capacitors at least once before the individual voltages appear at the plurality of lines, second voltage biasing circuitry for simultaneously biasing the outputs of the first capacitors before the individual voltages appear at the lines and selectively biasing the output of each of the first capacitors again in the presence of the individual voltages at the lines, a plurality of first buffers respectively connected to the outputs of the first capacitors, scanning circuitry for selectively coupling the output of each of the first buffers to a circuit node, a second buffer for producing an output signal, a second capacitor connected between the circuit node and the second buffer, and third voltage biasing circuitry for biasing the output of the second capacitor before the individual voltages appear at the lines and at periodic intervals before each of the first capacitors is selectively biased again by the second biasing circuitry.

BRIEF DESCRIPTION OF THE DRAWINGS

The present invention will be described in further detail with reference to the/accompanying drawings, in which.

DETAILED DESCRIPTION

Figure 1:
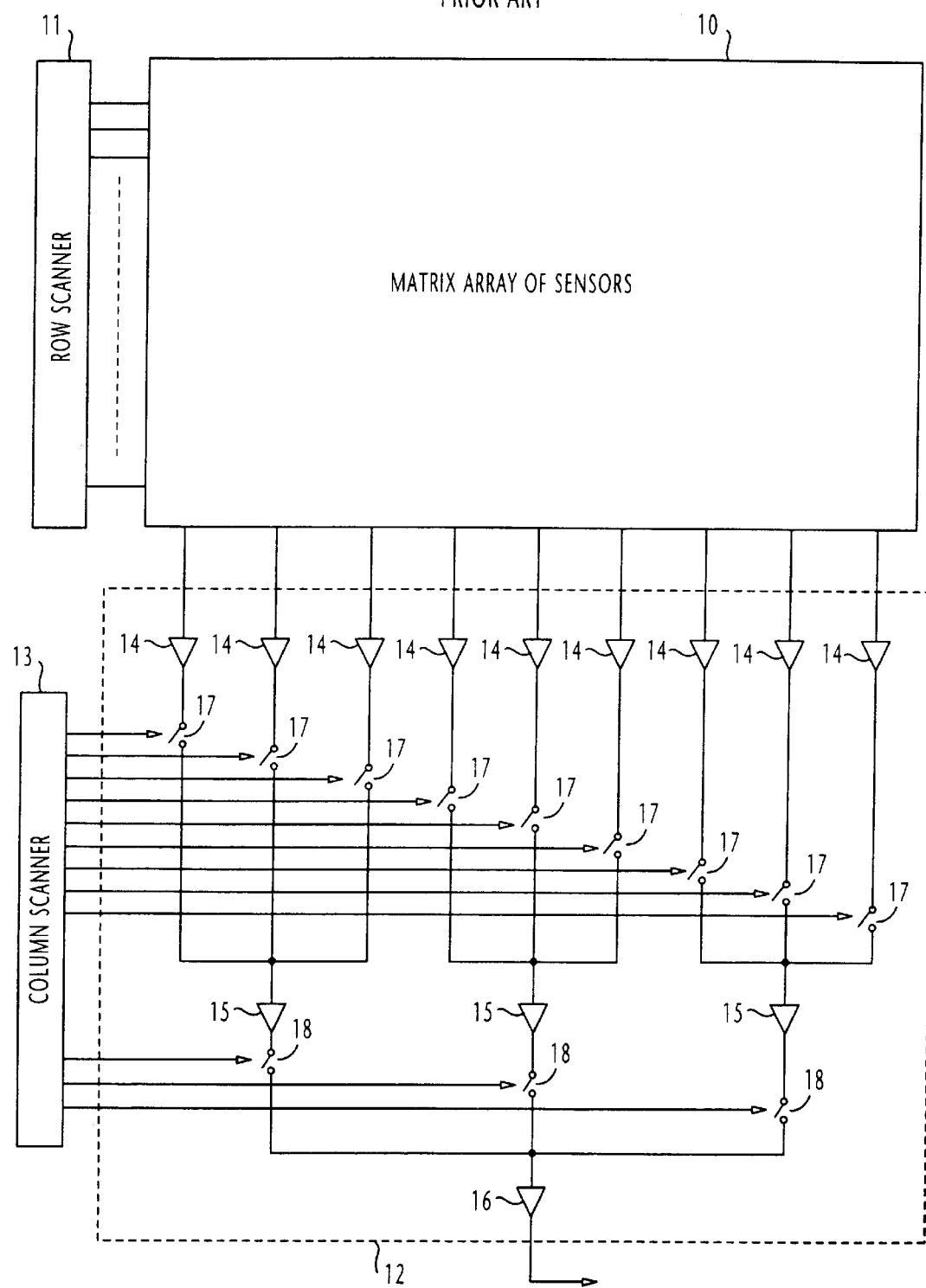
FIG. 1 is a block diagram of a solid-state imaging device using a prior art hierarchical column readout multiplexer.
Figure 2:
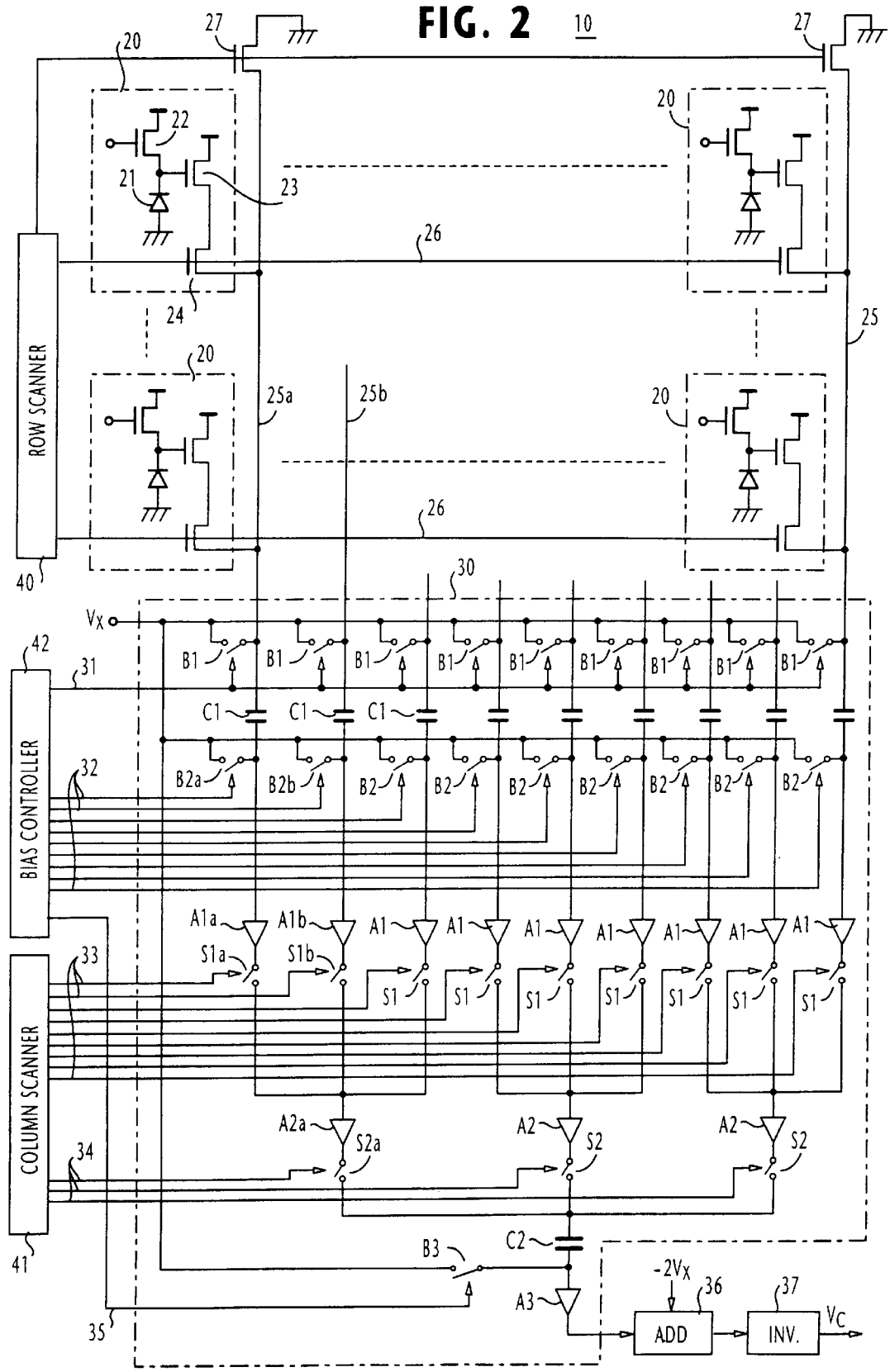
FIG. 2 is a block diagram of a solid-state imaging device with a hierarchical column readout multiplexer according to the present invention.

In FIG. 2, an improved hierarchical pixel readout multiplexer of the present invention is generally indicated by numeral 30 and the matrix pixel array 10, identical to the prior art, is shown in detail.

In each pixel 20, a photodiode 21 is biased by a transistor (MOSFET) 22 to develop a charge corresponding to the intensity of light incident thereon. The developed charge is amplified by a transistor 23 and coupled through a row select transistor 24 to an associated column select line 25 when the transistor 24 responds to a signal supplied on a row select line 26 from the row scanner 40. A current source transistor 27 is connected to each column select line 25 to jointly form a source follower circuit with the amplifying transistor 23 of each pixel when the row select transistor 24 of the pixel is turned on. Because of the source follower configuration, the voltage developed at each column select line 25 is approximately equal to the voltage produced by each photodiode.

Hierarchical pixel readout multiplexer 30 of this invention comprises a plurality of first-stage buffers (or unity-gain amplifiers) A1 respectively connected to the column select lines 25 via respective capacitors C1. The first-stage buffers A1 are divided into a plurality of groups with which second-stage buffers A2 are respectively associated. For each of the column select lines, a first bias switch B1, a second bias switch B2 and a third bias switch B3 are provided. These bias switches are connected to a bias source at potential $V_x$ for biasing the associated column select line 25, the input of the associated first-stage buffer A1, and the input of the third-stage buffer A3 under control of a bias controller 42. The first bias switches B1 are all controlled by a signal on a single control line 31 and the second bias switches B2 are either simultaneously or individually controlled by signals on respective control lines 32. The third bias switch B3 is controlled by a signal on a control line 35.

The output of each first-stage buffer A1 is connected by a first scan switch S1 to the input of the associated second-stage buffer A2 whose output is in turn connected by a second scan switch S2 via a common capacitor C2 to the input of the third-stage buffer A3. All scan switches S1 and S2 are individually operated by signals on control lines 33 and 34 under control of the column scanner 41.

Figure 3:
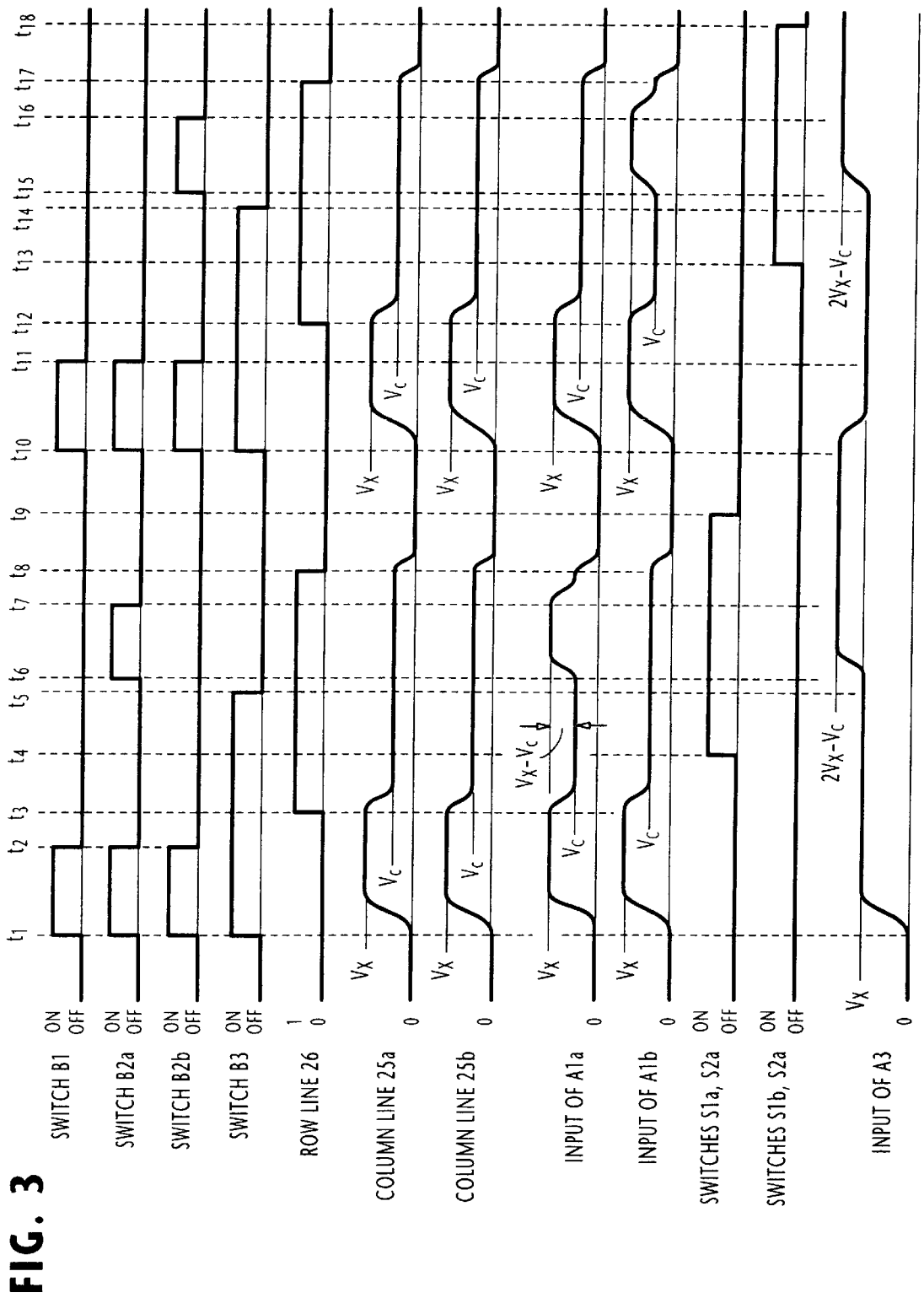
FIG. 3 is a timing diagram illustrating the operation of the multiplexer according to a first mode of the present invention.

The following is a description of a first mode of operation of the hierarchical readout multiplexer 30 with reference to FIGS. 2 and 3. Note that in the following explanation elements associated with column select lines 25a and 25b will be referred to by letters "a" and "b" added to the character/numerals that identify the elements.

At time $t_1$, all bias switches B1, B2 and B3 are simultaneously turned on, biasing all the column select lines 25, the inputs of all first-stage buffers A1 and the input of the third-stage buffer A3 to the same voltage $V_x$. Therefore, the column select lines 25a, 25b and the inputs of buffers A1a, A1b and A3 are raised to $V_x$ as shown in FIG. 3. At time $t_2$, the bias switches B1 and B2 are simultaneously turned off.

Subsequently, at time $t_3$, the row scanner 40 activates one of the row select lines 26 by switching its logic state from 0 (low) to 1 (high) to turn on all transistors 24 of the selected row and causes all the current source transistors 27 to be turned on. The source voltages of all bias transistors 22 of the selected row (i.e., the output voltages of the corresponding photodiodes 21) appear at the corresponding column select lines 25. Since a capacitor C1 is interposed between each column select line 25 and an associated first-stage buffer A1, a voltage increment on the column select line is capacitively coupled through the capacitor C1 to the input of the associated buffer A1. If the voltage coupled from the respective pixel to a column select line is $V_c$, the voltage increment of the line is equal to $V_c-V_x$. The bias voltage Vx is therefore cancelled and the input of each of the first-stage buffers A1 is brought to a voltage $V_x+(V_c-V_x)=V_c$ as shown in FIG. 3.

With the bias switch B3 still being turned on and a row select line 26 being activated, the column scanner 41 is conditioned, at time $t_4$, to read the output voltage of the first-stage buffer A1a by operating the scan switches S1a and S2a. Thus, the output voltage of the first-stage buffer A1a is coupled via the second-stage buffer A2a to the second capacitor C2. As a result, the input terminal of the capacitor C2 is driven to a level equal to $V_c$.

At time $t_5$, the third bias switch B3 is turned off. This brings the input of the third-stage buffer A3 into an electrically floating condition. Under this floating condition, the second bias switch B2, which is associated with the column of interest, is activated again. In the illustrated case, the bias switch B2a is turned on at time $t_6$. As a result, the input of the first-stage buffer A1a is brought to $V_x$ again, as illustrated. This voltage level is transferred to the second capacitor C2 via the second-stage buffer A2a. Since the input of the third-stage buffer A3 is coupled to the second-stage buffer A2a via the capacitor C2, the voltage increment $V_x-V_c$ of buffer A1a is transferred to the input of third-stage buffer A3. As a result, the output voltage of the third-stage buffer A3 is equal to $V_x+(V_x-V_c)=2V_x-V_c$.

At time $t_7$, the second bias switch B2a is turned off, and at time $t_8$, the row select line 26 is deactivated. At time $t_9$, the scan switches S1a and S2a are turned off, terminating the readout of the column select line 26a. The output of buffer A3 is delivered to an external circuit when it attains a stabilized value. Since $V_C$ is the desired signal, the external circuit may include an adder 36 where the output of buffer A3 is summed with a value $-2V_x$ and then the polarity of the adder output is inverted by an inverter 37 to produce an output voltage $V_C$.

A similar sequence proceeds during time $t_{10}$ and time $t_{18}$. During this sequence, all the bias switches B1, B2 and B3 are turned on again during times $t_{10}$ and $t_{11}$ to bias all column select lines, all first-stage buffers A1 and the third-stage buffer A3. The same row select line 26 as in the previous sequence is activated again during times $t_{12}$ and $t_{17}$ and the scan switches S1b and S2a are turned on during times $t_{13}$ and $t_{18}$. Bias switch B2b is turned on during times $t_{15}$ and $t_{16}$ to bias the input of the first-stage buffer A1b so that its voltage increment $V_x-V_C$ is transferred to the third-stage buffer A3.

It will be seen from the foregoing discussion that it is only the voltage increment that is read out from each column select line. Assume that the first-stage buffer A1a has a voltage offset α and all the other first-stage buffers has zero voltage offset. Buffer A1a will produce an output voltage $V_c+α$ which is transferred to the capacitor C2 at time $t_4$ and then an output voltage $V_x+α$ which is transferred to the capacitor C2 at time $t_6$ when the input of buffer A3 is biased at $V_x$. Accordingly, the third-stage buffer A3 produces an output voltage $V_x+((V_x+α)-(V_C+α))=2V_x-V_C$, canceling the offset voltage of buffer A1a. Accordingly, the noise problem resulting from buffer offset voltages can be eliminated.

Figure 4:
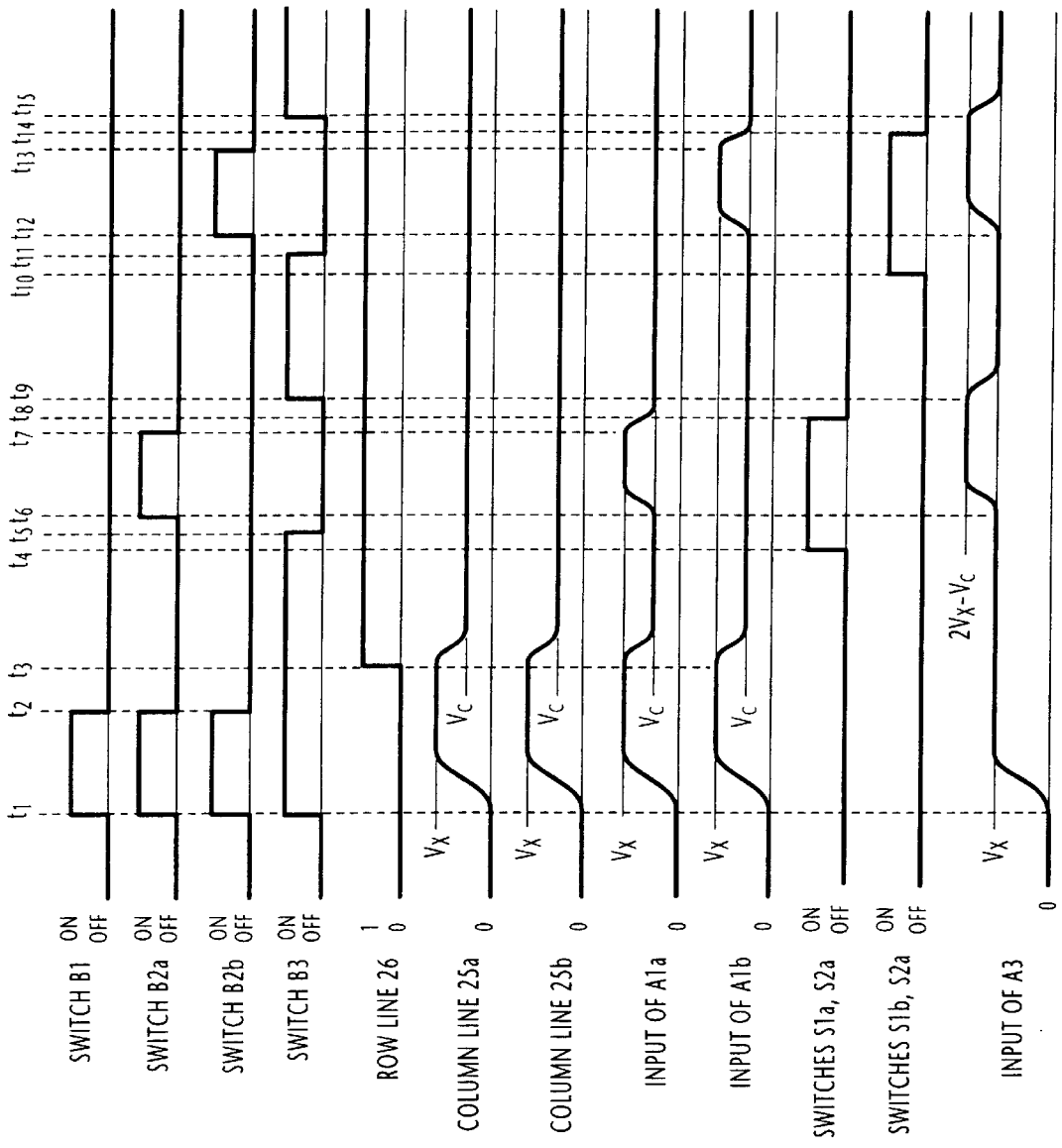
FIG. 4 is a timing diagram illustrating the operation of the multiplexer according to a second mode of the present invention.

FIG. 4 shows another mode of operation of the readout multiplexer 30, which differs from FIG. 3 in that the row select line of FIG. 4 is continuously activated.

Similar to FIG. 3, all bias switches B1 and B2 are in the ON state between time $t_1$ and $t_2$, and the bias switch B3 is in the ON state between times $t_1$ and $t_5$. At time $t_3$, the row scanner 40 activates one of the row select lines 26 to turn on all transistors 24 of the selected row and all the current source transistors 27, whereby the charge developed by of the photodiodes 21 of the selected row appear at the corresponding column select lines 25. Because of the presence of a capacitor C1, a voltage increment $(V_c-V_x)$ is transferred through the capacitor to the input of each buffer A1, causing its potential to change to $V_x+(V_x-V_c)=V_c$ by canceling the bias voltage $V_x$. At time $t_4$, the output voltage of the first-stage buffer A1a is read out by operating the scan switches S1a and S2a. Thus, the output voltage of the first-stage buffer A1a is coupled via the second-stage buffer A2a to the second capacitor C2 so that its input terminal is driven to $V_c$. At time $t_5$, the turn-off of third bias switch B3 causes the input of the third-stage buffer A3 to be isolated from any potential source. Under this floating condition, the bias switch B2a is turned on again at time $t_6$ to drive the input of the first-stage buffer A1a to $V_x$ again. This voltage level is transferred to the second capacitor C2 via the second-stage buffer A2a. Because of the presence of the capacitor C2, a voltage increment $V_x-V_c$ developed by the first-stage buffer A1a is transferred to the input of third-stage buffer A3 via second-stage buffer A2a, causing the input voltage of buffer A3 to change to $2V_x-V_c$. Bias switch B2a is turned off at time $t_7$ and the scan switches S1a, S2a are turned off at time $t_8$, terminating a readout operation from the column select line 25a.

At time $t_9$, the bias switch B3 is turned on again. With the row select line 26 still being activated, the scan switches S1b and S2a are turned on at time $t_{10}$. A readout operation is performed on the next column select line 25b by repeating the sequence of events that occurred at times $t_5$ to $t_9$ during a period $t_{11}$ through $t_{15}$ by operating the bias switch B2b.

What is claimed is:

1. A hierarchical readout circuit comprising:
   a plurality of first capacitors respectively interposed in a plurality of lines at which individual voltages are developed;
   a plurality of first buffers respectively connected to the outputs of said first capacitors;
   scanning circuitry for selectively coupling one of the outputs of the first buffers to a circuit node;
   a second buffer for producing an output signal;
   a second capacitor connected between the circuit node and the second buffer; and
   bias control circuitry for controlling potentials at the inputs and the outputs of said first capacitors and a potential at the output of said second capacitor so that the output signal of the second buffer contains a differential voltage between a bias voltage and each of said individual voltages, wherein said control circuitry is configured to simultaneously bias the inputs and outputs of said first capacitors before said individual voltages appear at said lines, selectively bias the output of each of the first capacitors again in the presence of said individual voltages at said lines, and periodically bias the output of the second capacitor before each of said first capacitors is selectively biased again.

2. A method of operating a hierarchical readout circuit connected to a plurality of lines at which individual voltages are developed, said readout circuit comprising a plurality of first capacitors respectively interposed in a plurality of lines, a plurality of first buffers respectively connected to the outputs of said first capacitors, a second buffer, and a second capacitor connected between a selected one of said first buffers and the second buffer, the method comprising the steps of:
   a) before said individual voltages appear at said lines, briefly biasing the inputs and the outputs of said first capacitors simultaneously and briefly biasing the output of said second capacitor;
   b) allowing said individual voltages to briefly appear at said lines and briefly biasing the output of said second capacitor;
   c) selecting one of said first buffers, briefly biasing the output of a corresponding one of said first capacitors and coupling the output of the selected first buffer to said second capacitor; and
   d) repeating steps (a) to (c).

3. A method of operating a hierarchical readout circuit connected to a plurality of lines at which individual voltages are developed, said readout circuit comprising a plurality of first capacitors respectively interposed in a plurality of lines, a plurality of first buffers respectively connected to the outputs of said first capacitors, a second buffer, and a second capacitor connected between a selected one of said first buffers and the second buffer, the method comprising the steps of:
   a) before said individual voltages appear at said lines, briefly biasing the inputs and the outputs of said first capacitors simultaneously and briefly biasing the output of said second capacitor;
   b) allowing said individual voltages to continuously appear at said lines and briefly biasing the output of said second capacitor;
   c) selecting one of said first buffers, briefly biasing the output of a corresponding one of said first capacitors and coupling the output of the selected first buffer to said second capacitor; and
   d) repeating step (c).

4. A solid-state imaging device comprising:
   a matrix array of photodiodes;
   a plurality of switching transistors respectively connected to said photodiodes for coupling voltages respectively developed by a row of said photodiodes to a plurality of lines;
   a plurality of first capacitors respectively interposed in said plurality of lines;
   a plurality of first buffers respectively connected to the outputs of said first capacitors;
   scanning circuitry for selectively coupling one of the outputs of the first buffers to a circuit node;
   a second buffer for producing an output signal;
   a second capacitor connected between the circuit node and the second buffer; and
   bias control circuitry for controlling potentials at the inputs and the outputs of said first capacitors and a potential at the output of said second capacitor so that the output signal of the second buffer contains a differential voltage between a bias voltage and each of said individual voltages, wherein said control circuitry is configured to simultaneously bias inputs and outputs of said first capacitors before said individual voltages appear at said lines, selectively bias the output of each of the first capacitors again in the presence of said individual voltages at said lines, and periodically bias the output of the second capacitor before each of said first capacitors is selectively biased again.

* * * * *